U S011934627B1

(12) United States Patent
Kawamura et al.

(10) Patent No.: US 11,934,627 B1
(45) Date of Patent: Mar. 19, 2024

(54) 3D USER INTERFACE WITH SLIDING CYLINDRICAL VOLUMES

(71) Applicant: Sony Interactive Entertainment LLC, San Mateo, CA (US)

(72) Inventors: Daisuke Kawamura, San Mateo, CA (US); Udupi Ramanath Bhat, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 18/061,921

(22) Filed: Dec. 5, 2022

(51) Int. Cl.
*G06F 3/04815* (2022.01)
*G03H 1/22* (2006.01)

(52) U.S. Cl.
CPC .......... *G06F 3/04815* (2013.01); *G03H 1/22* (2013.01)

(58) Field of Classification Search
CPC .............................. G06F 3/04815; G03H 1/22
See application file for complete search history.

(56) References Cited

U.S. PATENT DOCUMENTS

2017/0363867 A1* 12/2017 Poulos ............... G02B 27/0179
2022/0026736 A1* 1/2022 Miller .................... H04N 13/32

FOREIGN PATENT DOCUMENTS

| JP | 2004101929 | * | 4/2004 | ............. G03B 21/00 |
| JP | 2004101929 | A | 4/2004 | |
| JP | 2015114636 | * | 6/2015 | ............... G03H 1/22 |
| JP | 2015114636 | A1 | 6/2015 | |

OTHER PUBLICATIONS

"International Search Report and Written Opinion", dated Dec. 28, 2023, from the counterpart PCT application PCT/US23/079412.

* cited by examiner

*Primary Examiner* — Nelson M Rosario
*Assistant Examiner* — Scott D Au
(74) *Attorney, Agent, or Firm* — John L. Rogitz; John M. Rogitz

(57) ABSTRACT

A UI for a 3D display is presented in stand by style as a home UI system for a holographic display. The UI provides a live view of a current application and computer game. The behavior of the UI may change according to the distance between an imaged viewer and the display. The UI provides some minimal interaction with the characters in the live view. The UI can be used to control interaction of the holographic display.

16 Claims, 11 Drawing Sheets

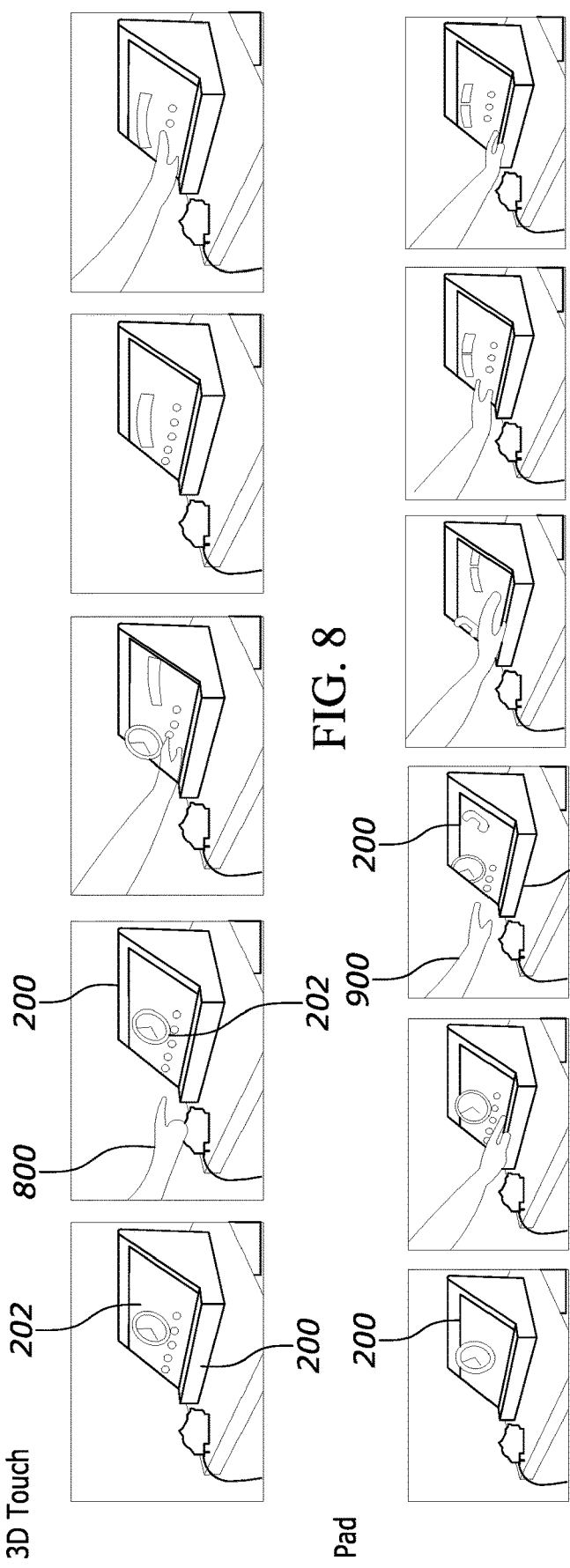
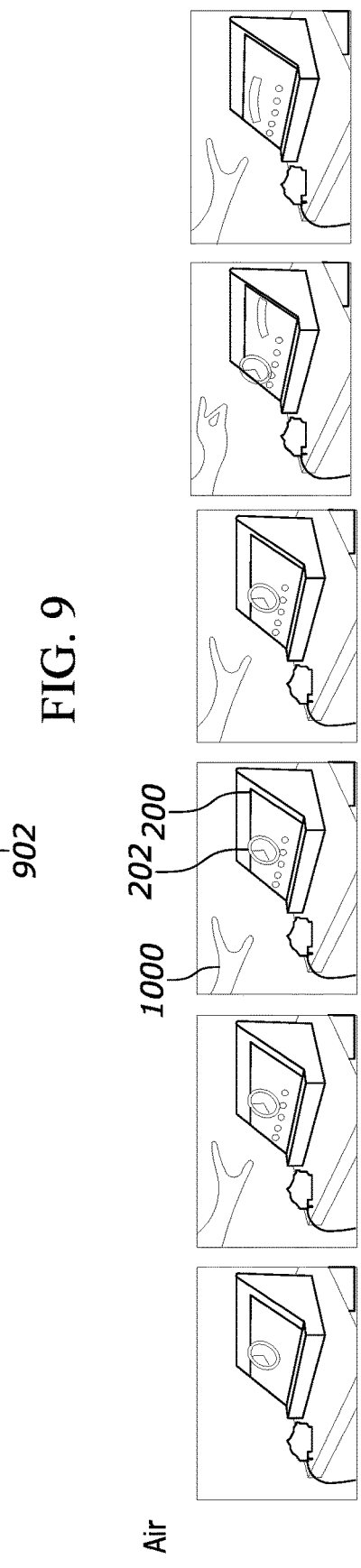
FIG. 8
FIG. 9
FIG. 10

3D USER INTERFACE WITH SLIDING CYLINDRICAL VOLUMES

FIELD

The present application relates generally to 3D UIs and in particular to 3D UIs with sliding cylindrical volumes.

BACKGROUND

As understood herein, 3D displays may be used for a variety of purposes including for presenting 3D video or computer games.

SUMMARY

Present principles also understand that user interfaces (UI) for such 3D displays can be tailored to leverage the 3D effect to improve user enjoyment and operability. A 3D UI is disclosed for launching content for, e.g., 3D spatial display games, and the UI may always be invoked or in standby.

Present principles recognize that computer game devices are used only when a user plays a specific game. But as understood herein, the holographic display on which a 3D game is presented can be used for greater effect as an "always stand by" device in the home use case. The Home UI provides an appropriate communication timing with users in their life activities like a timer and a family photo frame. The UI also expands game play time during the small interaction mode.

Accordingly, an apparatus includes at least one processor configured to present a home user interface (UI) on a holographic display. The processor also is configured to present, as part of the home UI, a live view of at least one computer simulation being executed by at least one simulation engine that does not control the home UI. Moreover, the processor is configured to establish a first behavior of the home UI responsive to a viewer of the holographic display being at a first distance from the holographic display, establish a second behavior of the home UI responsive to the viewer of the holographic display being at a second distance from the holographic display, and establish a third behavior of the home UI responsive to the viewer of the holographic display being at a third distance from the holographic display.

In one embodiment the first distance is less than the second distance and the first behavior include causing at least one 3D object on the home UI to interact with the viewer behavior, which can include speaking, gesturing, and combinations thereof. The first behavior may also include presenting audible description of an event in the computer simulation. In some examples the second behavior includes presenting information and animating at least one object on the holographic display regardless of viewer behavior. In example implementations the third distance is greater than the second distance, and the third behavior may include presenting a 2D indication of time in a power save mode.

In example embodiments the home UI can include plural cylinders of content translationally movable across the holographic display. The processor may be configured to illuminate a center one of the cylinders more than cylinders on either side of the center one of the cylinders. The processor further may be configured to illuminate a single character in the center one of the cylinders more than other objects in the center one of the cylinders.

If desired, the processor may be programmed to present on the home UI an indication of an incoming telephone call.

In another aspect, a device includes at least one computer storage that is not a transitory signal and that in turn includes instructions executable by at least one processor to present a home user interface (UI) on a holographic display. The instructions also are executable to present, as part of the home UI, a live view of at least one computer simulation being executed by at least one simulation engine that does not control the home UI. The home UI includes plural cylinders of content translationally movable across the holographic display.

In another aspect, a method includes presenting a home user interface (UI) on a holographic display. The method also includes presenting, as part of the home UI, a live view of at least one computer simulation being executed by at least one simulation engine that does not control the home UI. The method further includes establishing a behavior of the home UI responsive to a viewer distance from the holographic display.

The details of the present application, both as to its structure and operation, can be best understood in reference to the accompanying drawings, in which like reference numerals refer to like parts, and in which:

BRIEF DESCRIPTION OF THE DRAWINGS

FIG. 8 is a series of frames illustrating control of the home UI using screen touch;

FIG. 9 is a series of frames illustrating control of the home UI using a touch pad;

FIG. 10 is a series of frames illustrating control of the home UI using gestures in the air;

DETAILED DESCRIPTION

Figure 1:
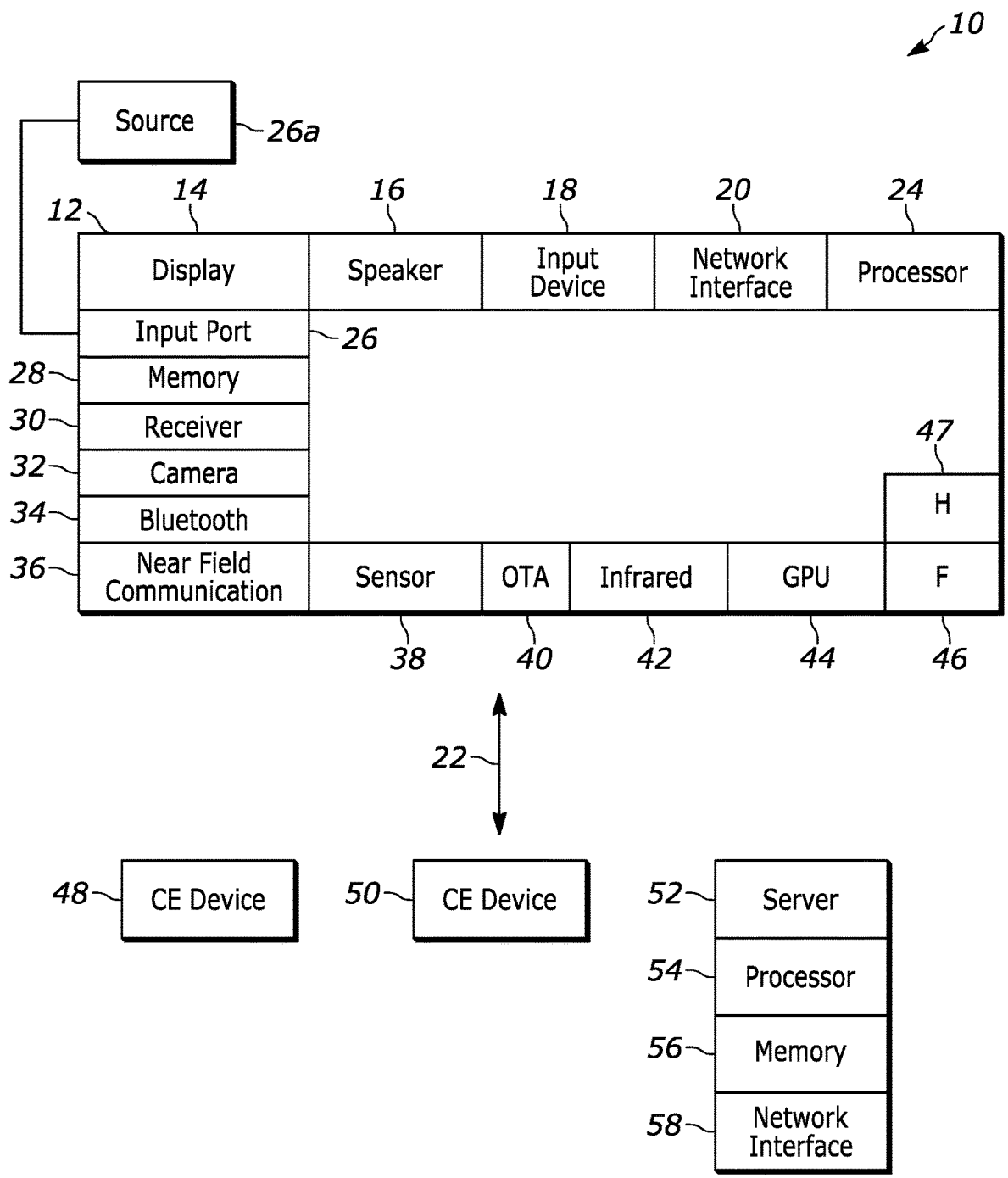
FIG. 1 is a block diagram of an example system in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen, or a 3D holographic display. The display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. Other example input devices include gamepads or mice or keyboards.

The example AVD 12 may also include one or more network interfaces 20 for communication over at least one network 22 such as the Internet, an WAN, an LAN, etc., under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as stand-alone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the aforementioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
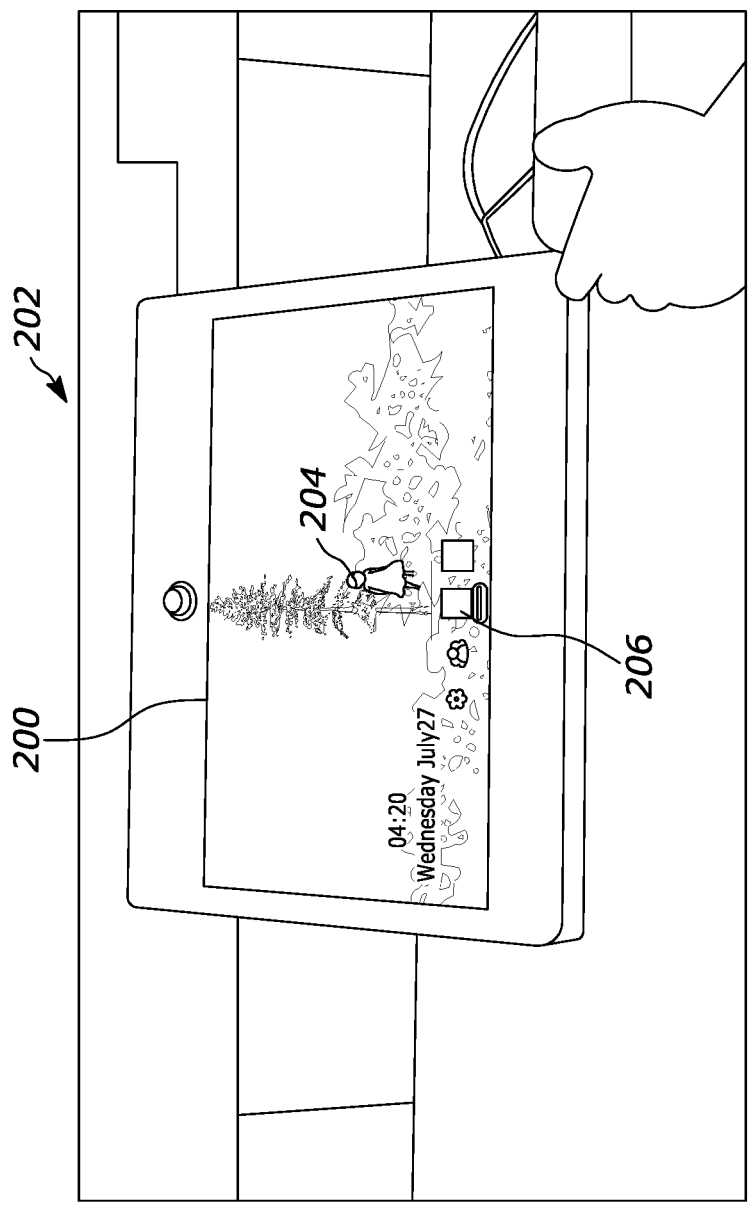
FIG. 2 illustrates an example home UI on an example 3D holographic display.
Figure 3:
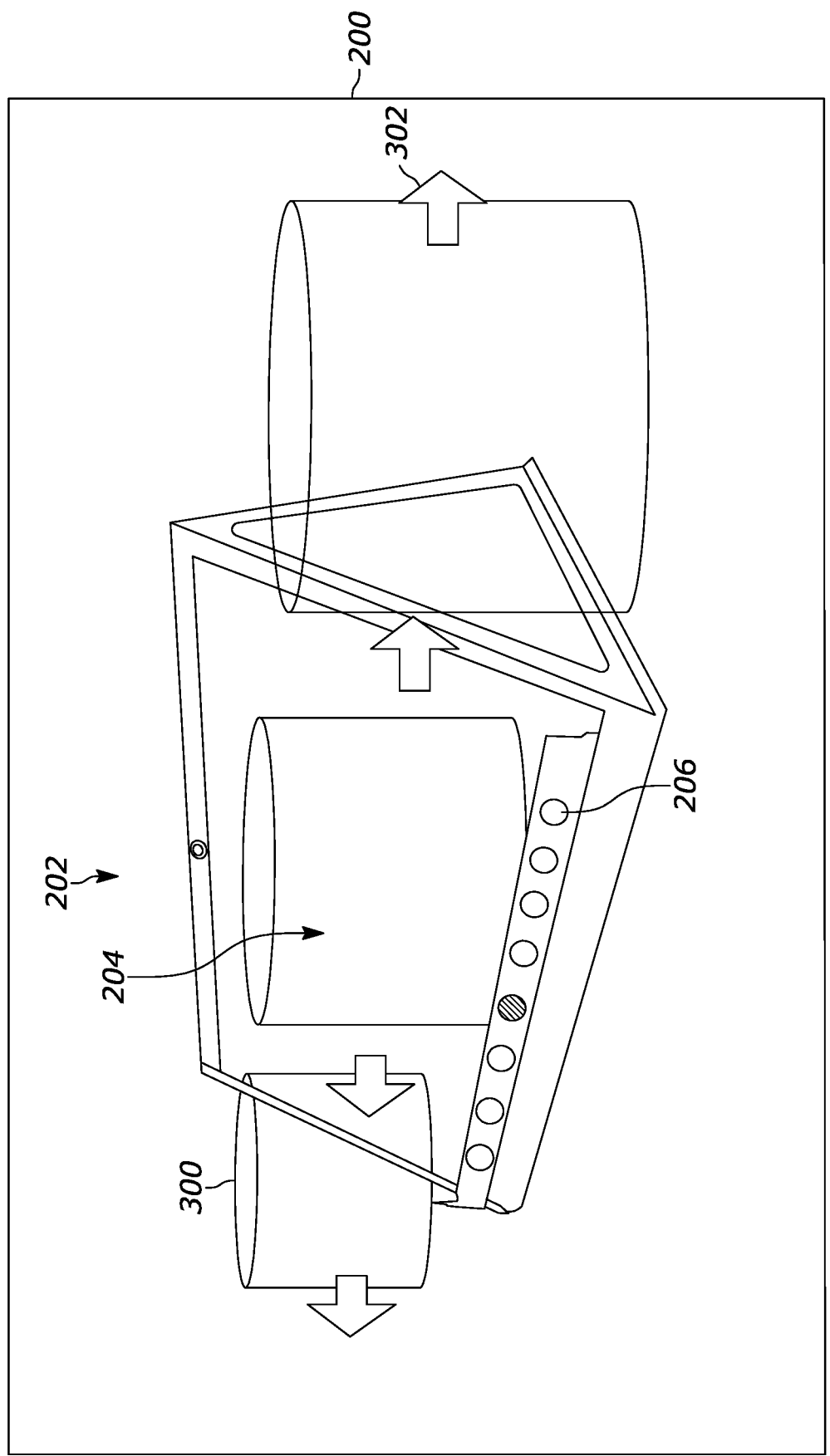
FIG. 3 schematically illustrates example home UI structure.

Refer now to FIGS. 2 and 3. A 3D holographic display 200 presents a home user interface (UI) 202. As part of the home UI, a live view 204 may be presented from an application such as a computer simulation such as a computer game being executed by a game engine that does not control the home UI. Thus, the processor presenting the home UI communicates with the game engine to receive the live view 204 from the game engine.

In cross-reference to FIGS. 2 and 3, the home UI can include plural cylinders 300 (FIG. 3) of content translationally movable across the holographic display as indicated by the arrows 302. The cylinders 300 may be moved by a user as discussed further below responsive to gestures on a track pad, or responsive to gestures in free space, or responsive to touch swipes on the surface of the display when the display is provided with touch capability. As illustrated in FIG. 3, a cylinder being viewed may be moved to appear as if it is scrolled "off" the display, with a new cylinder occupying the center region of the display. Note that the structure in memory is of a 3D cylinder but an actual visible cylinder need not be presented on the display.

FIGS. 2 and 3 illustrate that a center one of the cylinders 300 may be illuminated to appear brighter than cylinders on either side of the center one of the cylinders. Indeed, a character 204 (FIG. 2) in the center cylinder may be illuminated to appear brighter than other objects in the center cylinder. Cylinders to the side of the center cylinder may be illuminated in lower light or not at all illuminated.

In the example of FIGS. 2 and 3, the cylinders 300 may represent respective content types. For instance, one cylinder may represent a preview gallery of games/apps for selection of one of the games/apps for presentation in a center cylinder with live fed from the game/app of the game "hero" being presented in the center cylinder. Selection of which cylinder to view may be afforded by a row of selection icons 206 with the selected one of the icons 206 being highlighted or otherwise indicated as being selected. Time of day may also be presented on the home UI as shown in FIG. 2.

Figure 4:
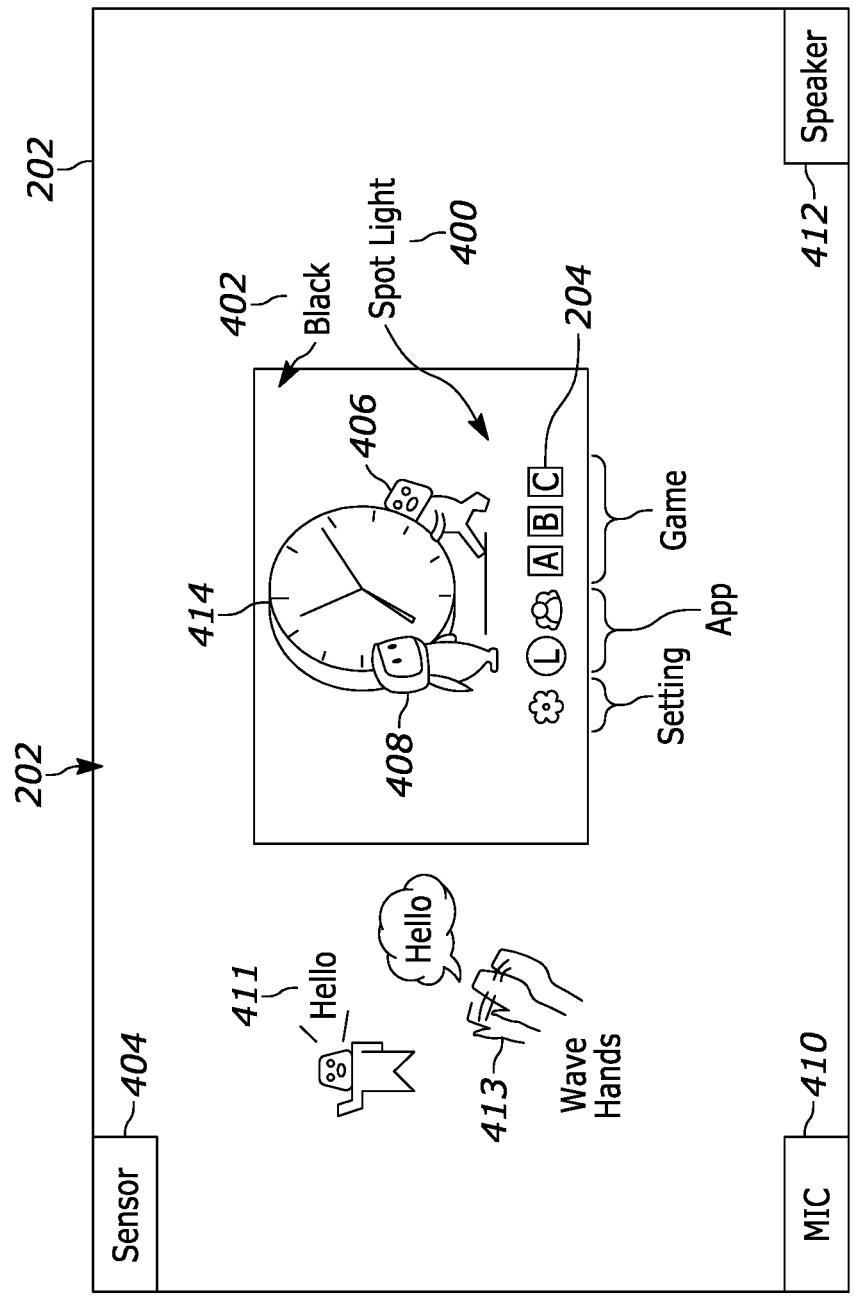
FIG. 4 schematically illustrates an example layout of the home UI.

FIG. 4 illustrates that the icons 206 can be arranged below the content cylinders so as not to block the view of the cylinders. The icons 206 may be presented in 2D or 3D. In FIG. 4 some of the icons represent respective apps and some represent respective computer games, and selection of an icon causes a live feed from the selected app or game to be presented in the center cylinder. As indicated at 400 in FIG. 4, illumination modeling a spotlight may be provided on the center cylinder and as mentioned above on a single character in the center cylinder, with dark or black background 402 concealing the other cylinders.

Furthermore, the UI 202 may be presented to exhibit behavior responsive to the behavior of a viewing user. Specifically, images from a sensor 404 such as a camera on the display 200 may be used to track the viewer's face or eyes and the direction of gaze of a 3D character 406 in the UI 202 moved to always "look" at the viewer. Thus, the characters always "know" the user's face location and the characters make a small interaction like a looking action.

3D characters 408 in the home UI also may respond to voice (as picked up by a microphone 410) and gestures from the viewer by repeating what the viewer said or responding appropriately with simple dialog to what the viewer said, and by responding to viewer gestures by having the characters mimic the gestures.

For example, if the viewer speaks "Hello" as schematically indicated at 411 in FIG. 4, the character 408 may be animated to speak the viewer's name if the viewer is recognized by face recognition or other method and synthesized speech played on a speaker 412 of the display 200 to the effect of "Hello [viewer name]".

Similarly, if a viewer waves his hand as schematically illustrated at 413 in FIG. 4, the character 408 may be animated to wave back and synthetic speech played on the speaker 412 to the effect of "Oh, hey".

The character 408 moreover may tell the user the current time as indicated on a time indicator 414. Further, the character 408 may audibly inform the user of action in the game world of the selected computer game as indicated by, e.g., metadata accompanying the feed of the game from the game engine. Example dialog a character 408 might be animated to speak and that can be played on the speaker 412 includes "Your friend is fighting with a boss and needs help", a game progress reminder such as "this is the new sword skill", and the like.

Figure 5:
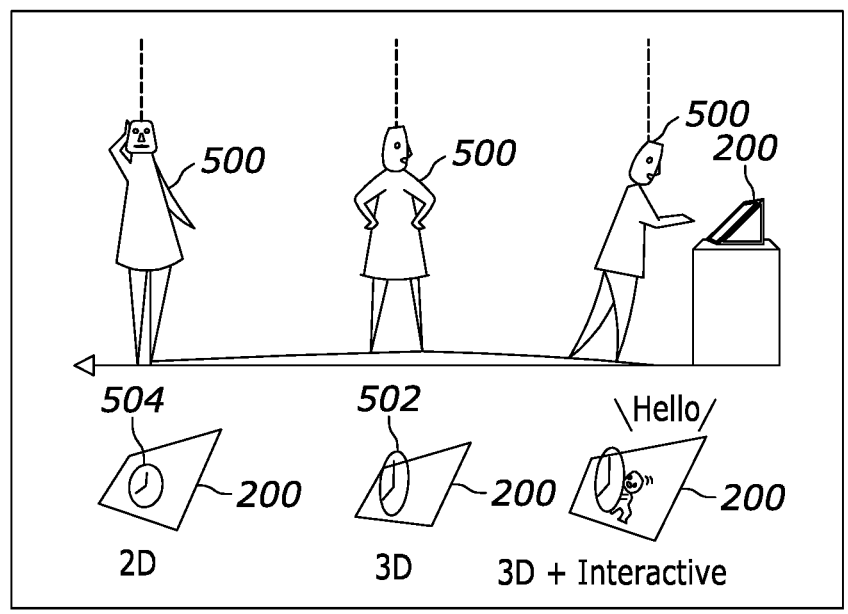
FIG. 5 schematically illustrates how the behavior of the home UI can change with distance to the viewing user.

FIG. 5 illustrates that the behavior of the home UI 202 may vary depending on the distance between a viewing user and the display 200. For example, as shown on the right in FIG. 5, when a user 500 is close to the display 200, full "on" functionality may be presented on the display 200, including 3D character presentation, live app/game views, and reactions to user speech and gestures.

On the other hand, when the user 500 is at a second distance from the display as shown in the middle of FIG. 5, the UI 202 may behave differently by presenting and having different functionality than in the full-on mode. In an example, when the user is at the second distance time indication 502 may be presented in 3D on the display 200 but no user interaction or character reaction to user speech/gestures may be implemented. Thus, in the intermediate distance behavior mode the display 200 may present information and animating at least one object such as a 3D character on the holographic display regardless of viewer behavior to entertain the user.

Yet again, when the user is at a third (far) distance from the display as shown on the left side of FIG. 5, the UI may present only a time indication 504 in 2D and may exhibit no other behavior, with components within the display being placed in a power save mode.

Transition between UI behavior modes may be made automatically as the user moves toward and away from the display. User distance may be inferred using image analysis of the user's face (as the face in the image gets smaller, greater distance is inferred) or by some other means such as active ranging using, e.g., sound or light.

Figure 6:
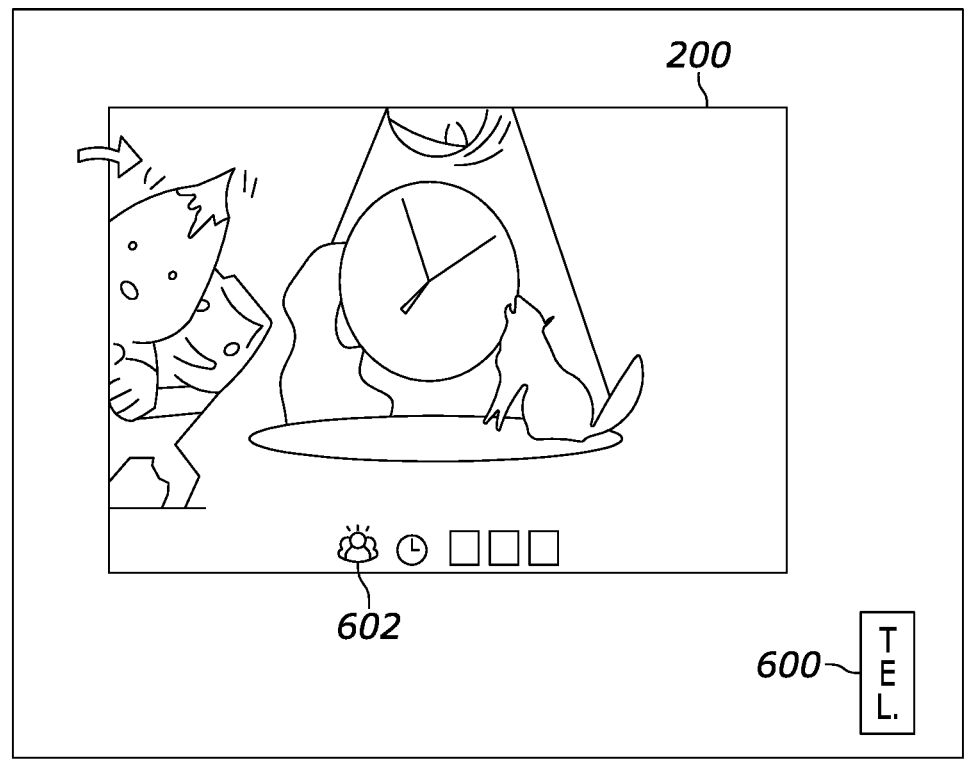
FIG. 6 schematically illustrates a behavior of the home UI in response to a phone call.

FIG. 6 illustrates that the display 200 may be in communication with a telephone 600. When a phone call is received, e.g., from a friend, the phone 600 can convey the fact of the phone call and the identity of the friend to the display 200 to cause an avatar 602 to appear on the display 200 indicating that the friend is calling. Or if someone is interacting online like "Watching your broadcasting" "Open an intention of friends help for his game play" "Waiting for you at the team lobby" etc., the event can also create similar avatar behavior.

Figure 7:
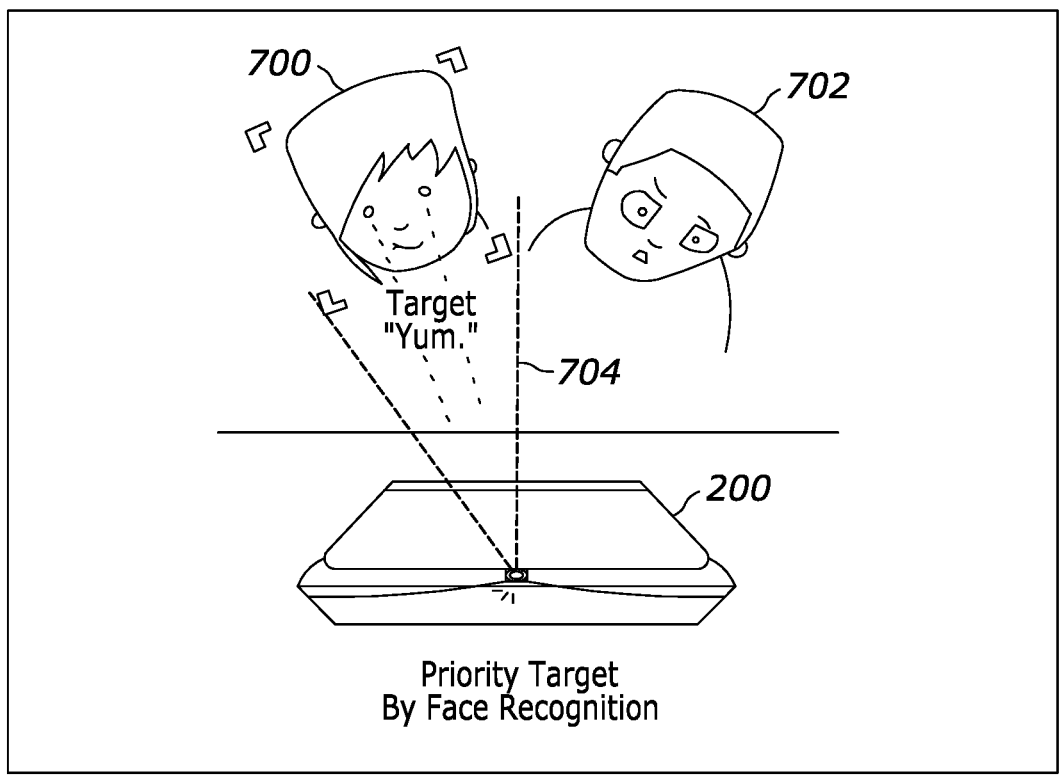
FIG. 7 schematically illustrates giving a recognized user priority.
Figure 11:
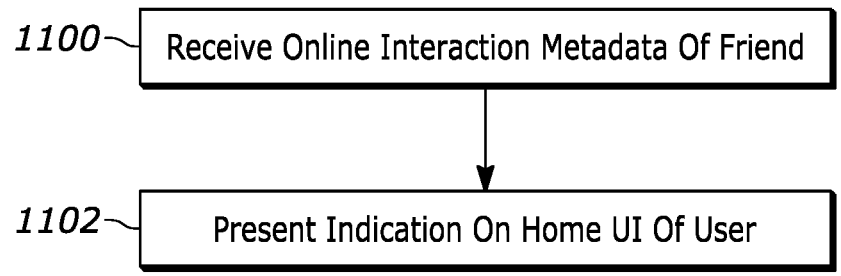
FIG. 11 illustrates example logic in example flow chart format for receiving online information from a friend.

FIG. 7 illustrates a recognized or prioritized user 700 and an unrecognized or not prioritized user 702. Using face recognition, the prioritized user 700 is recognized so that when both users 700, 702 are looking at the UI 202 on the display 200, the 3D stereoscopic view 704 is oriented toward the prioritized user 700.

FIG. 8 illustrates that the UI 202 described above may be controlled by a user using 3D touch, in which a user's hand or arm 800 can touch or approach a 3D volume of a selector on the UI to select the selector. A visual feedback may be provided to user of a touch. For example, if the user selects a launcher icon, a related list may be blinked or flicked and a related 3D character in the UI 202 may be "tickled" to squirm or laugh.

FIG. 9 illustrates that a touchpad control may be used by a user 900 to control the UI 202. The touch surface may be implemented on a base box 902 at the bottom of the display 200. A camera can detect the hand position and gesture with the base box. A flick sideways can slide the cylinders shown in FIG. 3. A tap on the base box can be correlated to a press of the enter key.

FIG. 10 illustrates that a user 1000 may gesture in free space, distanced from the display 200, to control the UI 202. A camera can detect the hand position/pose and map that to an application selector focus position. Selection of a control element on the UI may be made by pinching in with thumb and index finger, or by opening and closing the hand. This control can be used even if the user needs to keep a specific distance from the spatial display such as when the display is large.

FIGS. 11-18 illustrate logic consistent with the above that may be executed by any processor herein, such as one or more processors in the holographic display 200. Commencing at block 1100 in FIG. 11, metadata is received representing a friend's online interaction with a computer, such as computer game or app interaction on the part of the friend. An indication of the interaction may be presented at block 1102 on the home UI 202.

Figure 12:
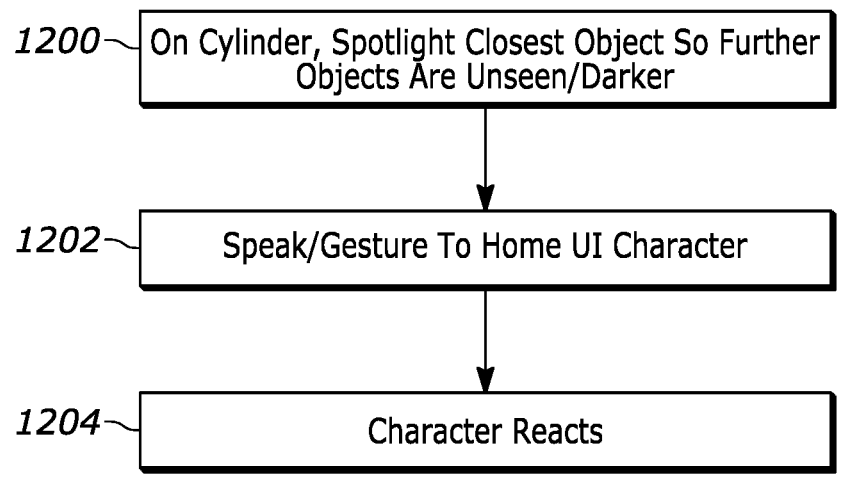
FIG. 12 illustrates example logic in example flow chart format for cylinder presentation.

FIG. 12 illustrates details of the "on" functionality described above when the user is close to the display. Commencing at block 1200, on the center cylinder a spotlight may be simulated on the closest or most important object such as a hero character with objects further away in the 3D presentation being darkened or not presented at all (blacked out). Proceeding to block 1202, a user may speak or gesture and in response at block 1204 the home UI reacts as by animating a character to gesture or speak in consonance with the user's input at block 1202.

Figure 13:
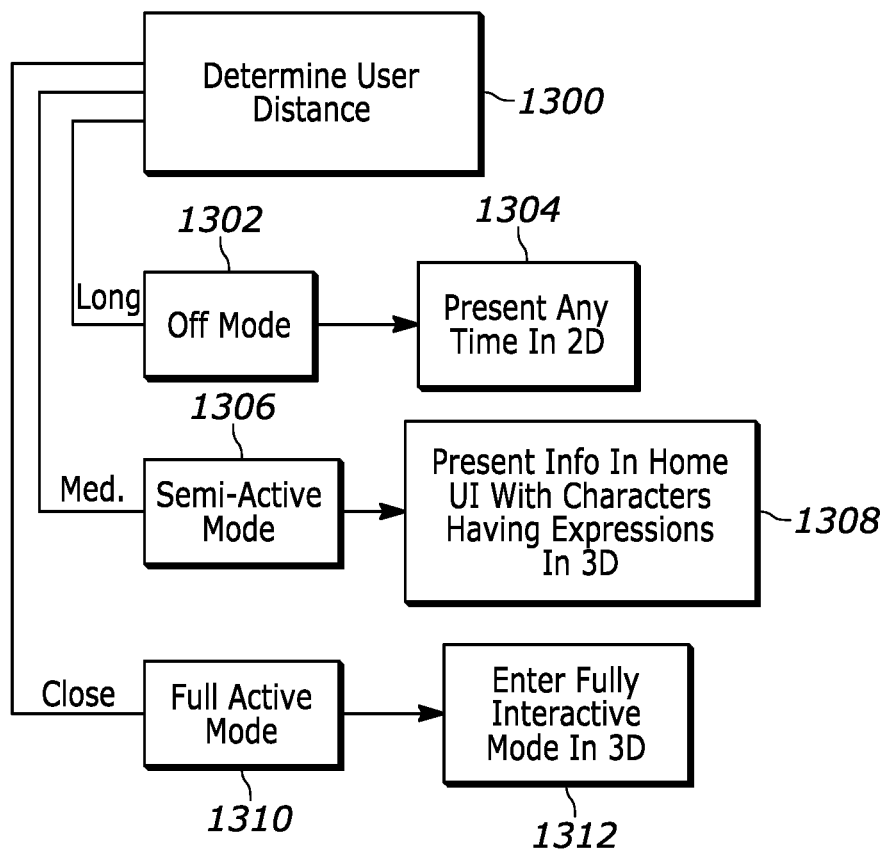
FIG. 13 illustrates example logic in example flow chart format for changing behavior of the home UI according to viewer distance from the display.

FIG. 13 illustrates the distance-dependent behavior of the UI 202 described above. The distance between the display 200 and user is determined at block 1300. When it is determined that the user is beyond a first distance, an off mode is entered at block 1302 and only an indication of time presented in 2D at block 1304, with components of the display 200 being in a power save mode.

However, if it is determined that the user is within the first distance of the display but beyond a second, closer distance, a semi-active mode is entered at state 1306 in which information is presented in 3D at block 1308 with characters being animated to have expressions that may be independent of anything the user does.

When it is determined that the user is within the second distance of the UI (i.e., is close), a fully active mode is entered at state 1310, in which at block 1312 the interactive mode described above is entered.

Figure 14:
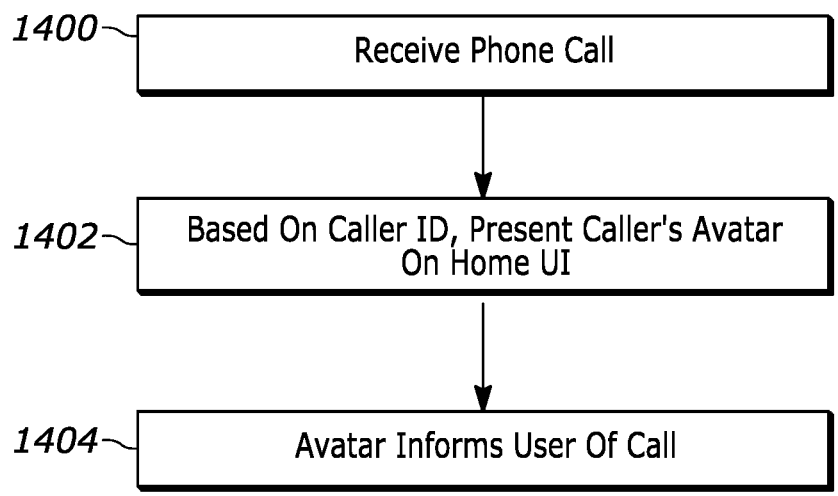
FIG. 14 illustrates example logic in example flow chart format for receiving a phone call.

FIG. 14 illustrates the phone call feature, in which a phone call is received at block 1400 and based, e.g., on the caller ID the caller's avatar is presented at block 1402. At block 1404 the avatar may audibly or visibly (as by blinking) inform the user of the incoming call.

Figure 15:
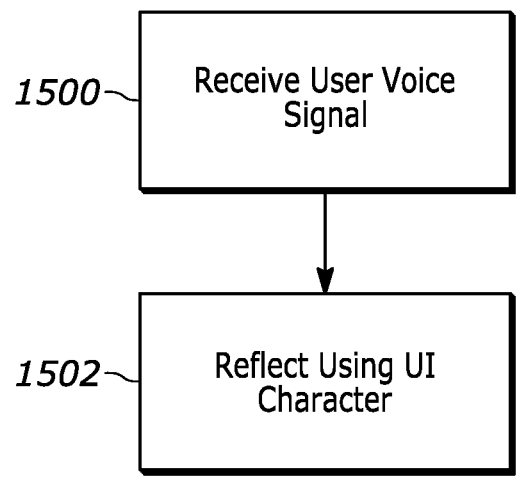
FIG. 15 illustrates example logic in example flow chart format for reflecting a user voice signal.

Turn now to FIG. 15. A user voice signal may be received when in the fully active mode at block 1500. Proceeding to block 1502, a character in the home UI 202 can react to the voice signal audibly and/or visibly as described previously.

Figure 16:
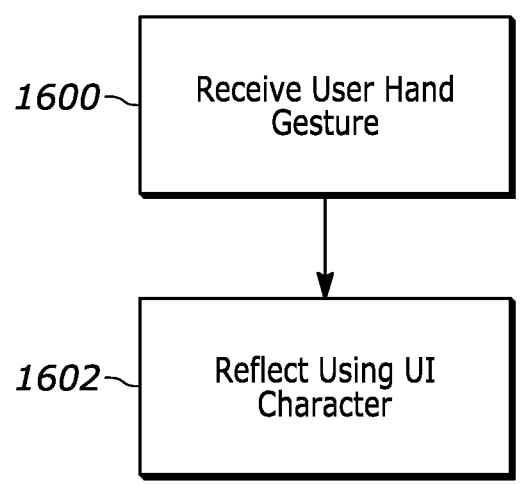
FIG. 16 illustrates example logic in example flow chart format for reflecting a user hand gesture.

Similarly, FIG. 16 illustrates that a user gesture in free space may be received at block 1600 in the fully active, causing the logic to move to block 1602 to reflect the gesture by having a character in the home UI 202 ape the gesture, for instance.

Figure 17:
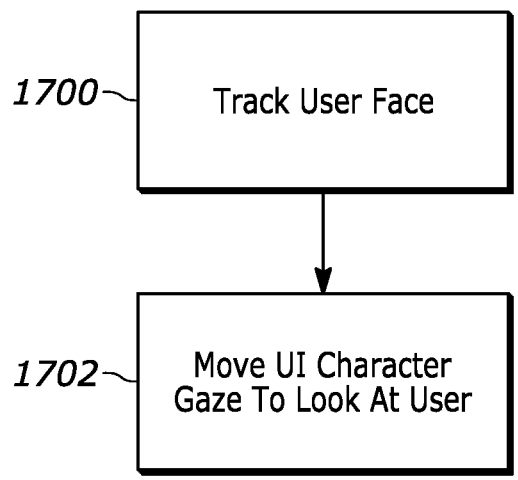
FIG. 17 illustrates example logic in example flow chart format for reflecting user movement.

Block 1700 in FIG. 17 illustrates that the user's face is tracked in the fully active mode using face tracking techniques such as may be embodied in one or more machine learning (ML) models. Moving to block 1702, in response to tracking the user's face a character in the home UI 202 is animated to "follow" the user's location by maintaining the gaze direction of the character at the user.

Figure 18:
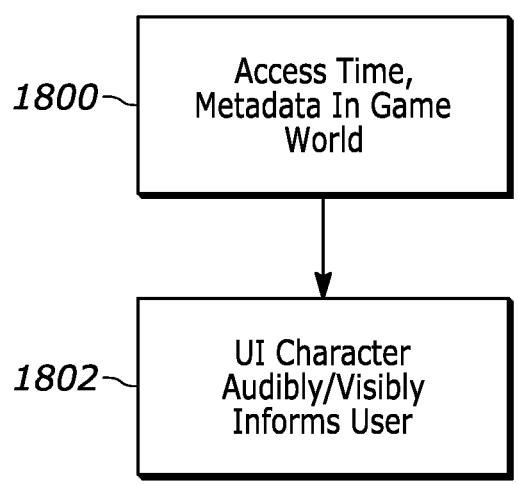
FIG. 18 illustrates example logic in example flow chart format for informing a user of activity in a game.

Now refer to FIG. 18. Commencing at block 1800, time and metadata from a game engine are accessed by the processor presenting the home UI. Proceeding to block 1802, a character in the home UI 202 may audibly and/or visibly be animated/played on a speaker to inform the user of the content of the metadata as well as the time if desired.

While the particular embodiments are herein shown and described in detail, it is to be understood that the subject matter which is encompassed by the present invention is limited only by the claims.

What is claimed is:

1. An apparatus comprising:
at least one processor configured to:
present a user interface (UI) on a holographic display;
present, as part of the UI, a live view of at least one computer simulation being executed by at least one simulation engine that does not control the UI;
establish a first behavior of the UI responsive to a viewer of the holographic display being at a first distance from the holographic display, the first behavior comprising presenting at least one 3D character that reacts to viewer behavior, presenting live app/game views, and presenting reactions to user speech and gestures;
establish a second behavior of the UI responsive to the viewer of the holographic display being at a second distance from the holographic display, the second behavior comprising presenting a time indication in 3D on the display and animating at least one 3D object on the display that does not react to viewer behavior; and
establish a third behavior of the UI responsive to the viewer of the holographic display being at a third distance from the holographic display, wherein at least at a first time the UI comprises plural cylinders of content translationally movable across the holographic display, a first cylinder representing content of a first type and a second cylinder representing content of a second type.

2. The apparatus of claim 1, wherein the first distance is less than the second distance and the third behavior comprises presenting a 2D time indication with the display being placed in a power save mode.

3. The apparatus of claim 1, wherein the processor is configured to animate at least one avatar or character on the display to look at a viewer as the viewer moves relative to the display.

4. The apparatus of claim 1, wherein the processor is configured to animate at least one avatar or character to respond to speech and/or gesture of a viewer.

5. The apparatus of claim 1, wherein the processor is configured to:
illuminate a center one of the cylinders more than cylinders on either side of the center one of the cylinders.

6. The apparatus of claim 5, wherein the processor is configured to:
illuminate a single character in the center one of the cylinders more than other objects in the center one of the cylinders.

7. The apparatus of claim 1, wherein the viewer behavior comprises speaking, gesturing, and combinations thereof.

8. The apparatus of claim 1, wherein the first behavior comprises presenting vocal description of an event in the computer simulation.

9. The apparatus of claim 1, wherein the processor is programmed to:
- present on the UI an indication of an incoming telephone call, the indication comprising animating an avatar on the display.

10. A device comprising:
- at least one computer storage that is not a transitory signal and that comprises instructions executable by at least one processor to:
- present a user interface (UI) on a holographic display;
- present, as part of the UI, a live view of at least one computer simulation being executed by at least one simulation engine that does not control the UI, wherein the UI comprises plural cylinders of content translationally movable across the holographic display;
- establish a first behavior of the UI responsive to a viewer of the holographic display being at a first distance from the holographic display;
- establish a second behavior of the UI responsive to the viewer of the holographic display being at a second distance from the holographic display; and
- establish a third behavior of the UI responsive to the viewer of the holographic display being at a third distance from the holographic display, wherein the first distance is less than the second distance and the first behavior comprises causing at least one 3D object on the UI to interact with the viewer behavior.

11. The device of claim 10, wherein the instructions are executable to:
- illuminate a center one of the cylinders more than cylinders on either side of the center one of the cylinders.

12. The device of claim 11, wherein the instructions are executable to:
- illuminate a single character in the center one of the cylinders more than other objects in the center one of the cylinders.

13. The device of claim 10, wherein the second behavior comprises presenting information and animating at least one object on the holographic display regardless of viewer behavior.

14. The device of claim 13, wherein the third distance is greater than the second distance, and the third behavior comprises:
- presenting a 2D indication of time in a power save mode.

15. A device comprising:
- at least one computer storage that is not a transitory signal and that comprises instructions executable by at least one processor to:
- present a user interface (UI) on a holographic display;
- present, as part of the UI, a live view of at least one computer simulation being executed by at least one simulation engine that does not control the UI, wherein the UI comprises plural cylinders of content translationally movable across the holographic display;
- establish a first behavior of the UI responsive to a viewer of the holographic display being at a first distance from the holographic display;
- establish a second behavior of the UI responsive to the viewer of the holographic display being at a second distance from the holographic display; and
- establish a third behavior of the UI responsive to the viewer of the holographic display being at a third distance from the holographic display,
- wherein the first behavior comprises presenting audible description of an event in the computer simulation.

16. A method, comprising:
- presenting a user interface (UI) on a holographic display;
- presenting, as part of the UI, a live view of at least one computer simulation being executed by at least one simulation engine that does not control the UI; and
- establishing a behavior of the UI responsive to a viewer distance from the holographic display, wherein a first behavior of the UI corresponding to a first distance comprises animating at least one 3D character that reacts to viewer behavior and wherein a second behavior of the UI corresponding to a second distance comprises animating at least one 3D character that does not react to viewer behavior, wherein at a first time the UI comprises plural cylinders of content translationally movable across the holographic display, each cylinder representing a respective content type.

* * * * *